Sept. 25, 1945.  A. J. BOYNTON  2,385,494
APPARATUS FOR AVERAGING MATERIALS
Filed Jan. 21, 1944  11 Sheets-Sheet 1
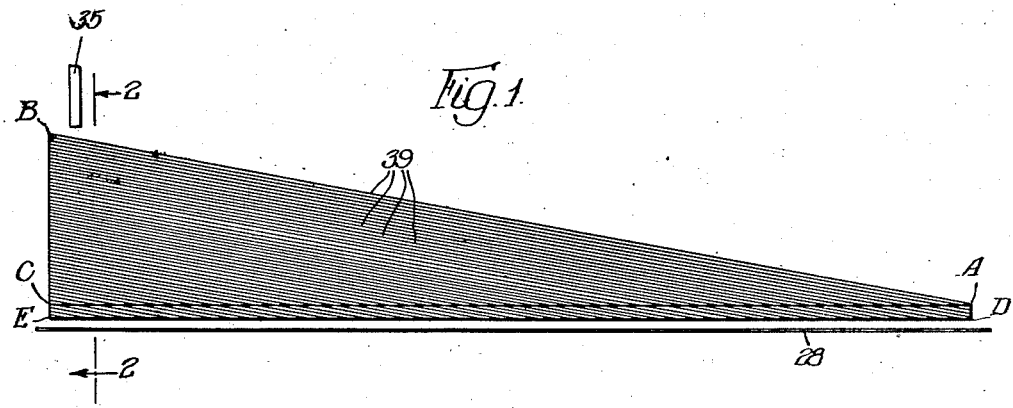
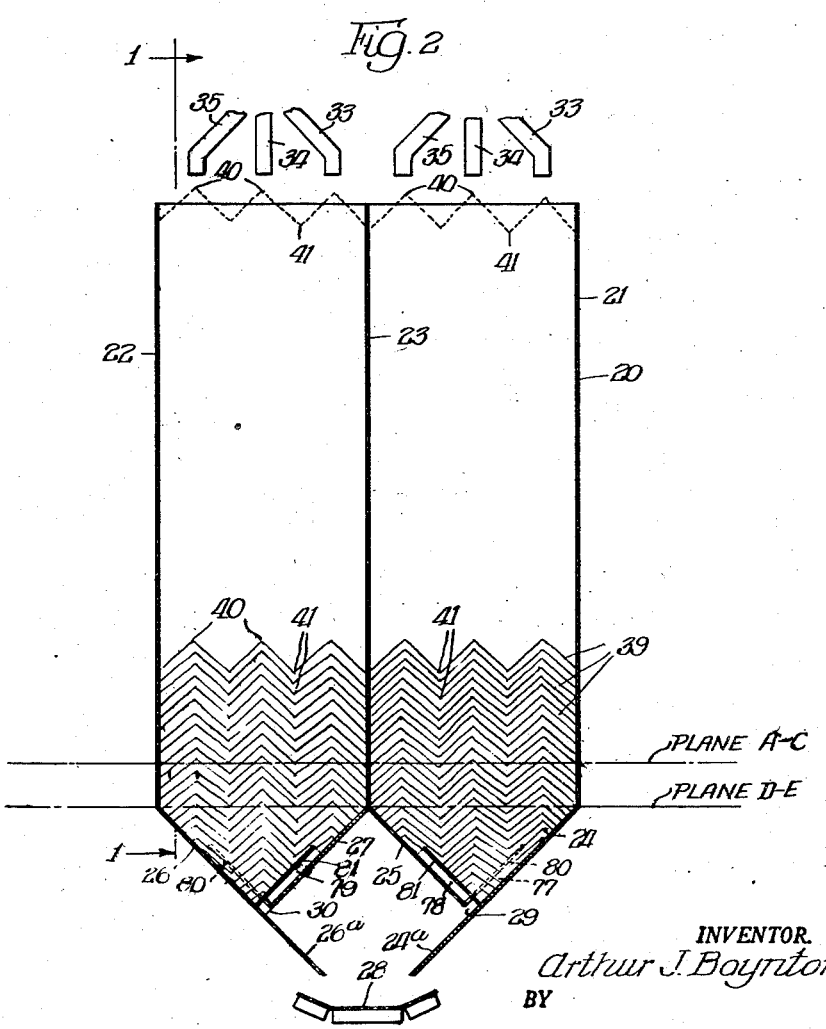
INVENTOR.
Arthur J. Boynton,
BY Sept. 25, 1945. A. J. BOYNTON 2,385,494
APPARATUS FOR AVERAGING MATERIALS
Filed Jan. 21, 1944 11 Sheets-Sheet 2
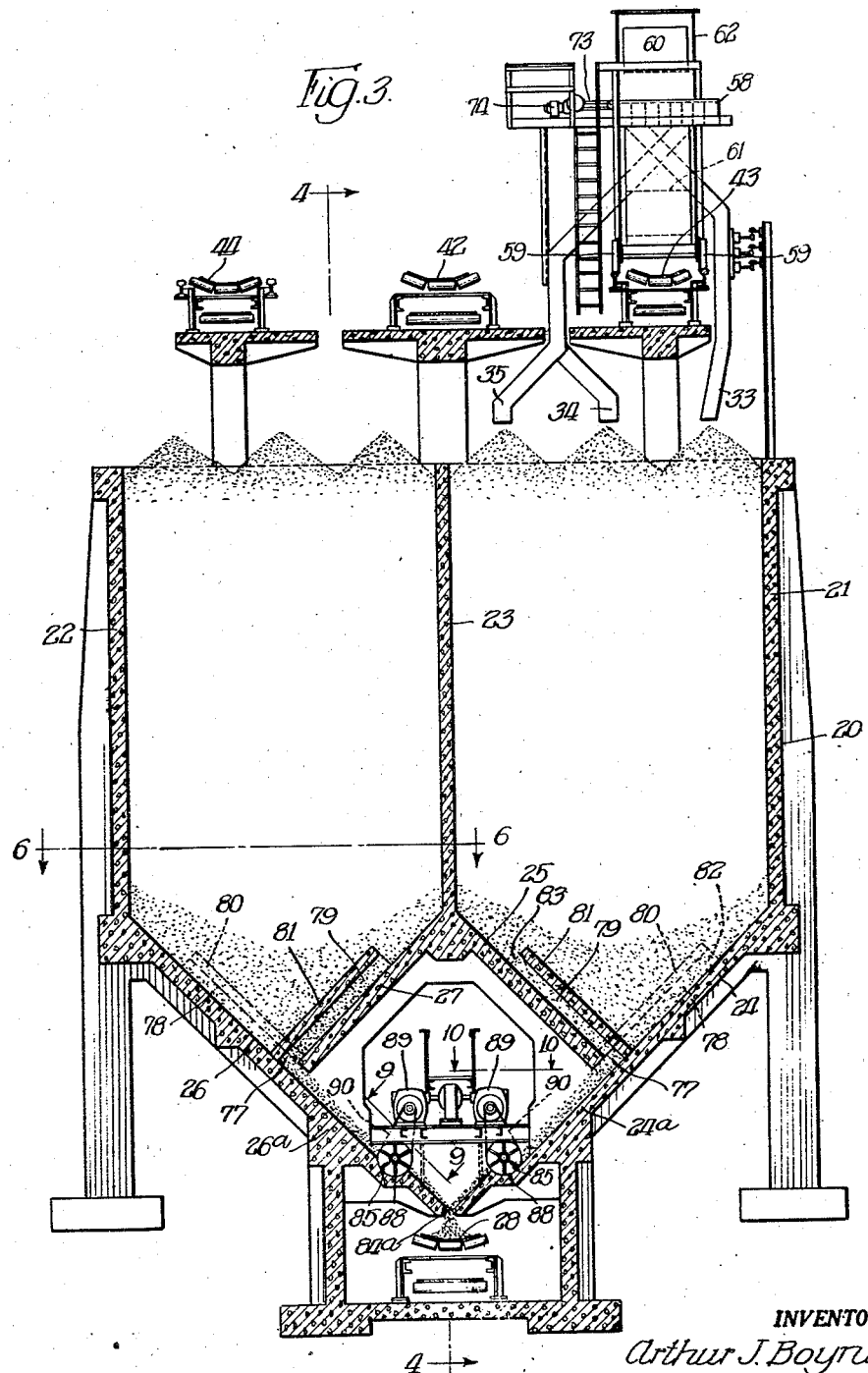

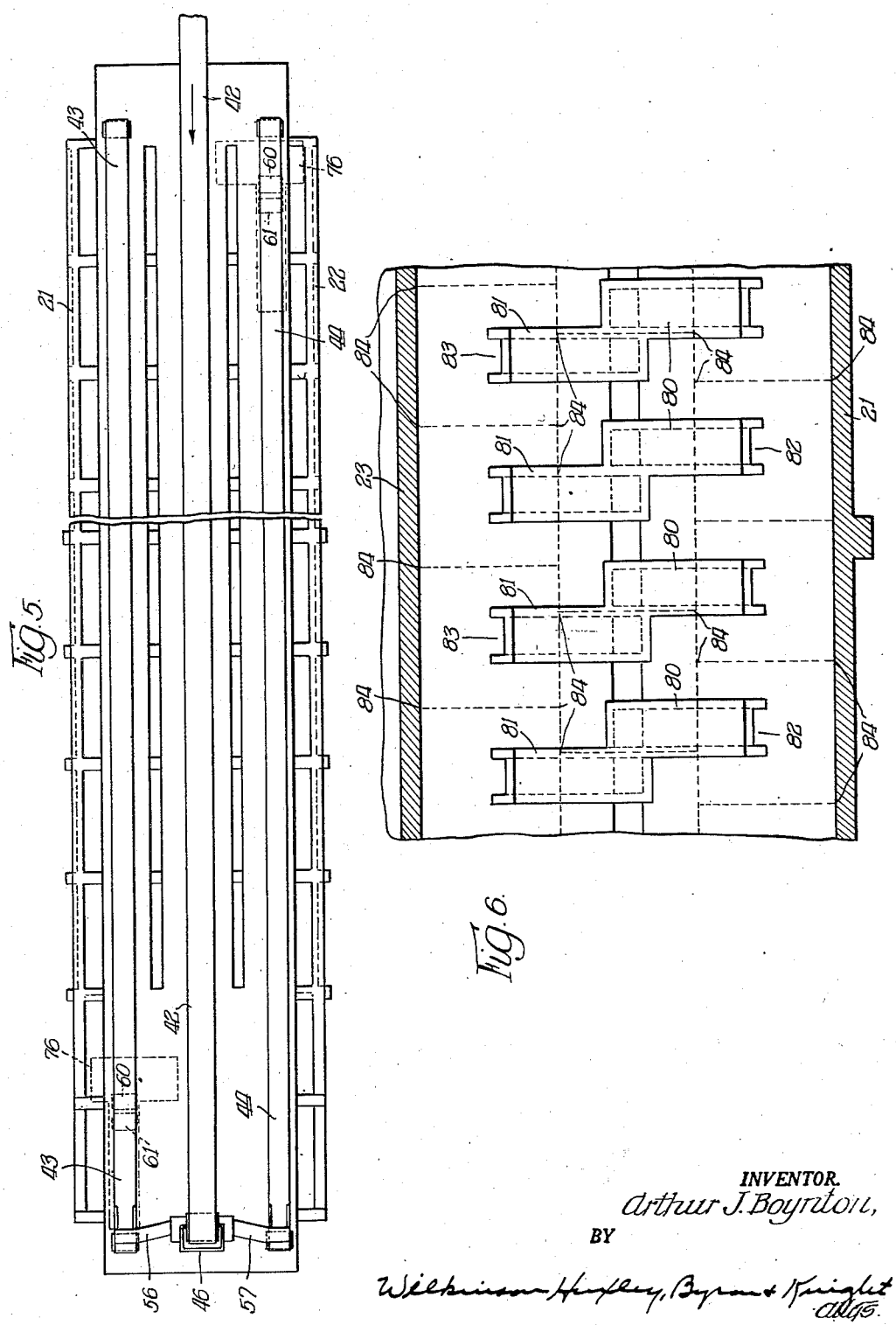

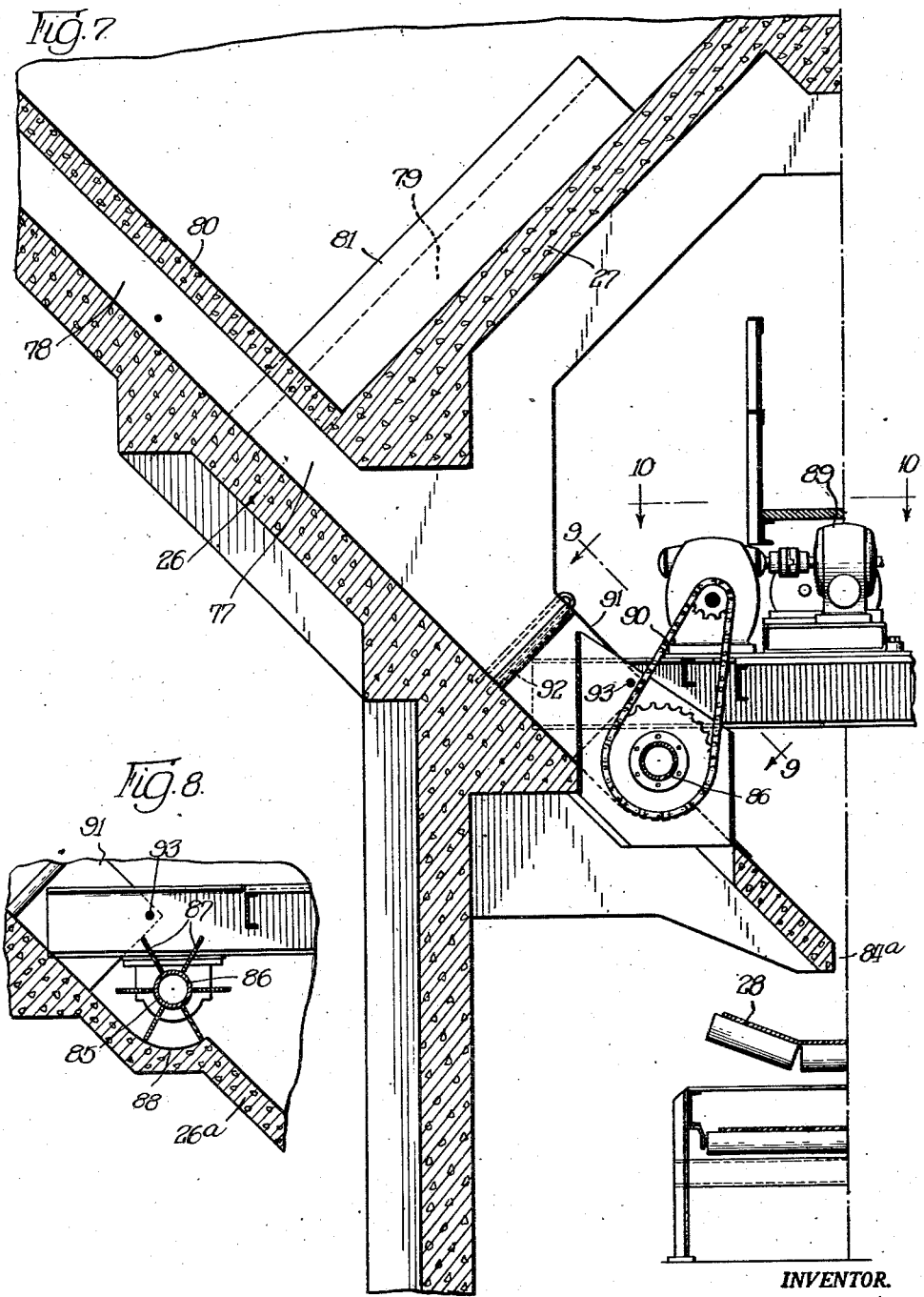

Sept. 25, 1945.  A. J. BOYNTON  2,385,494
APPARATUS FOR AVERAGING MATERIALS
Filed Jan. 21, 1944  11 Sheets-Sheet 6
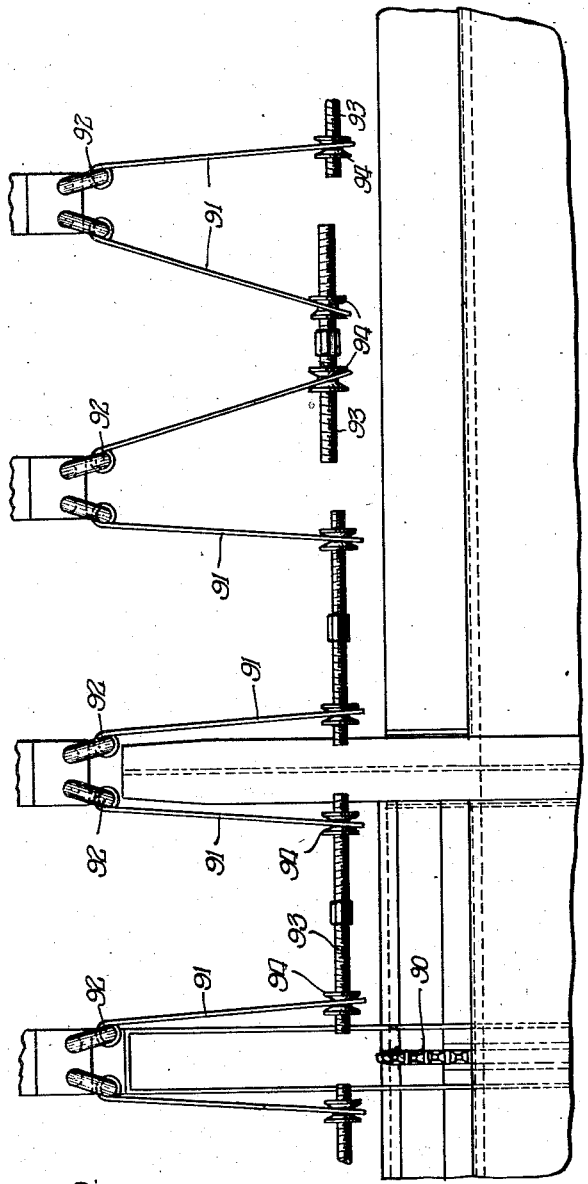
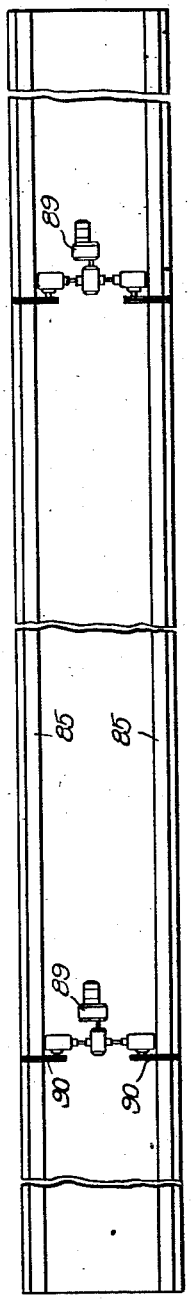
INVENTOR.
Arthur J. Boynton,
BY

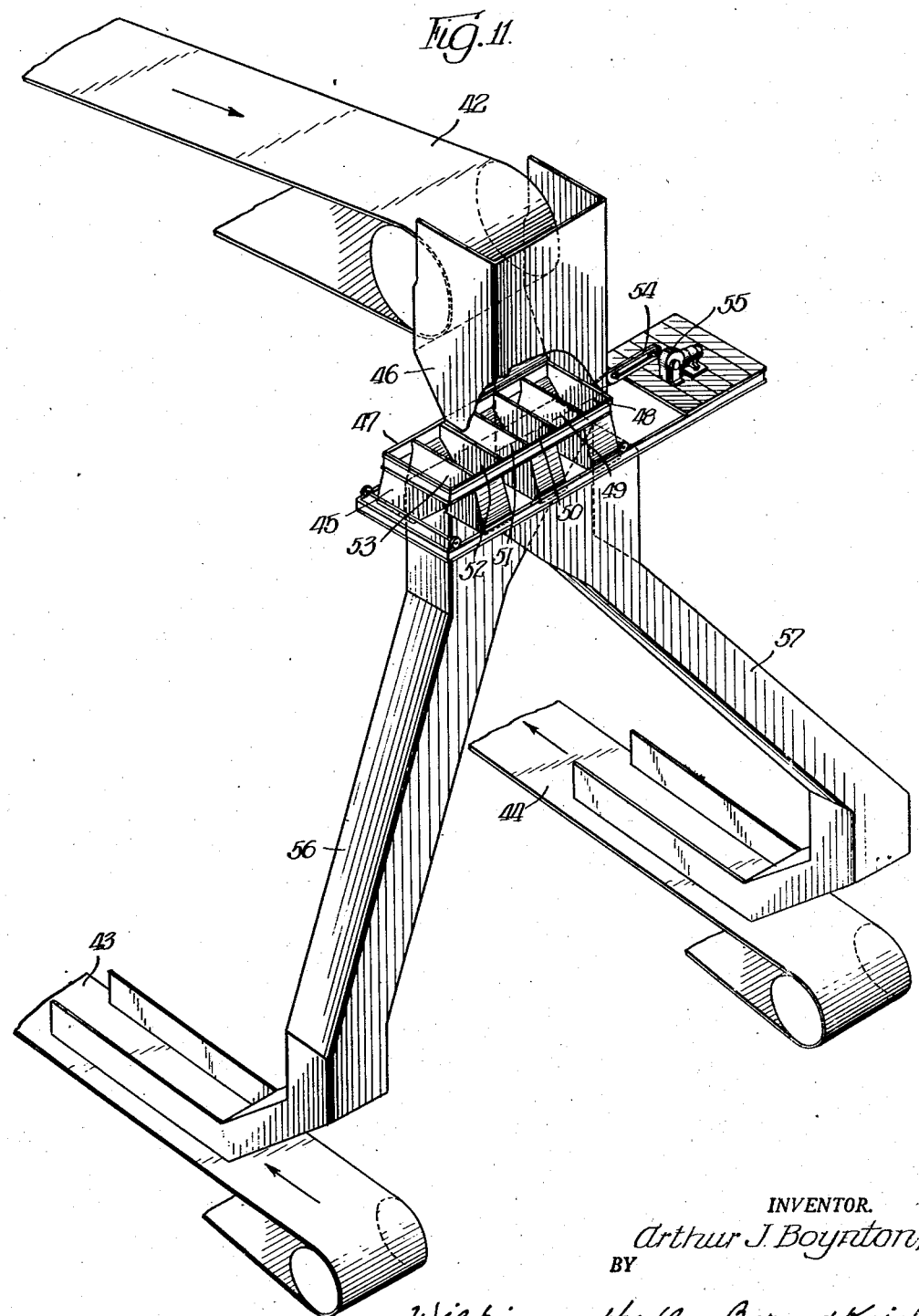

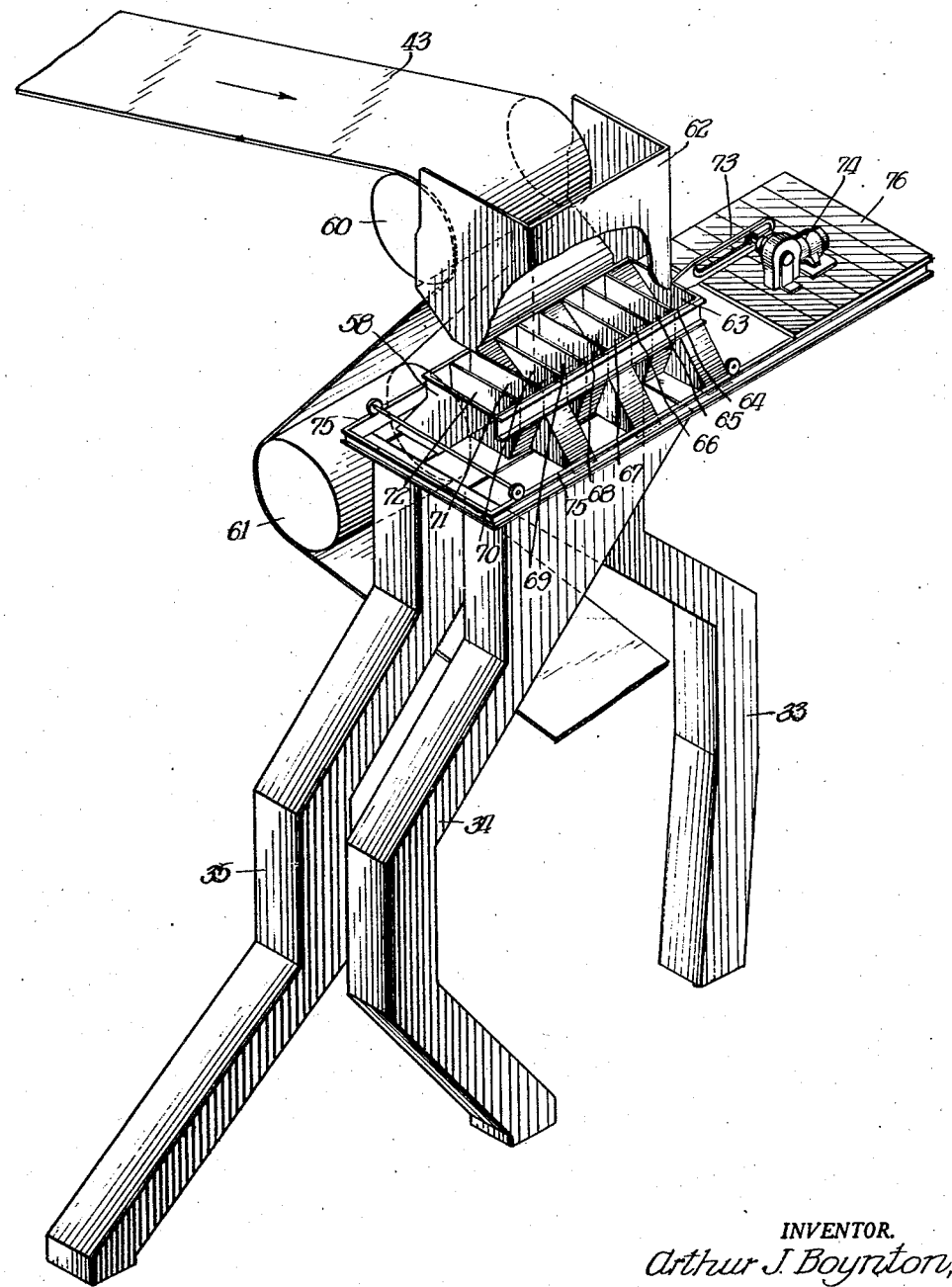

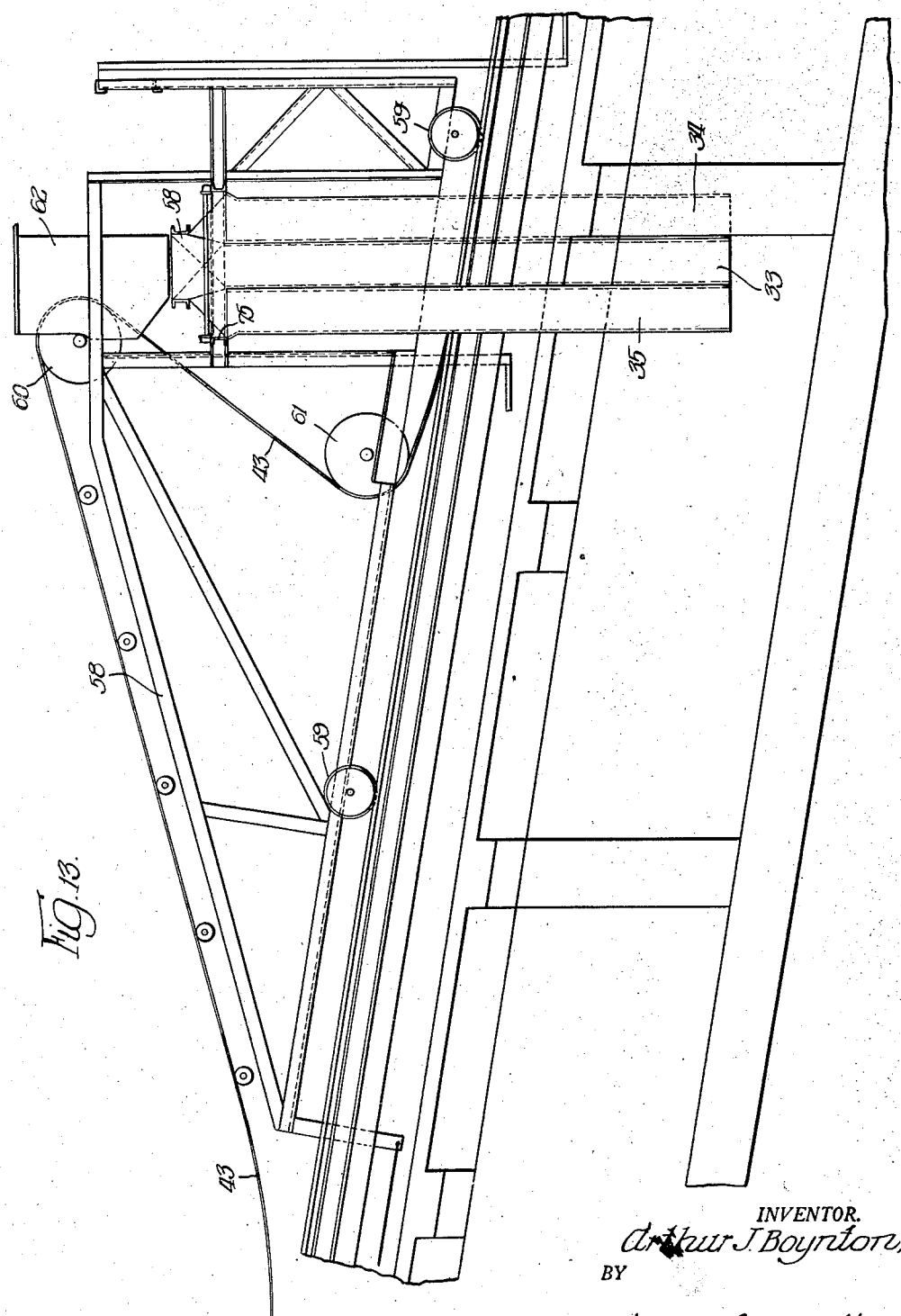

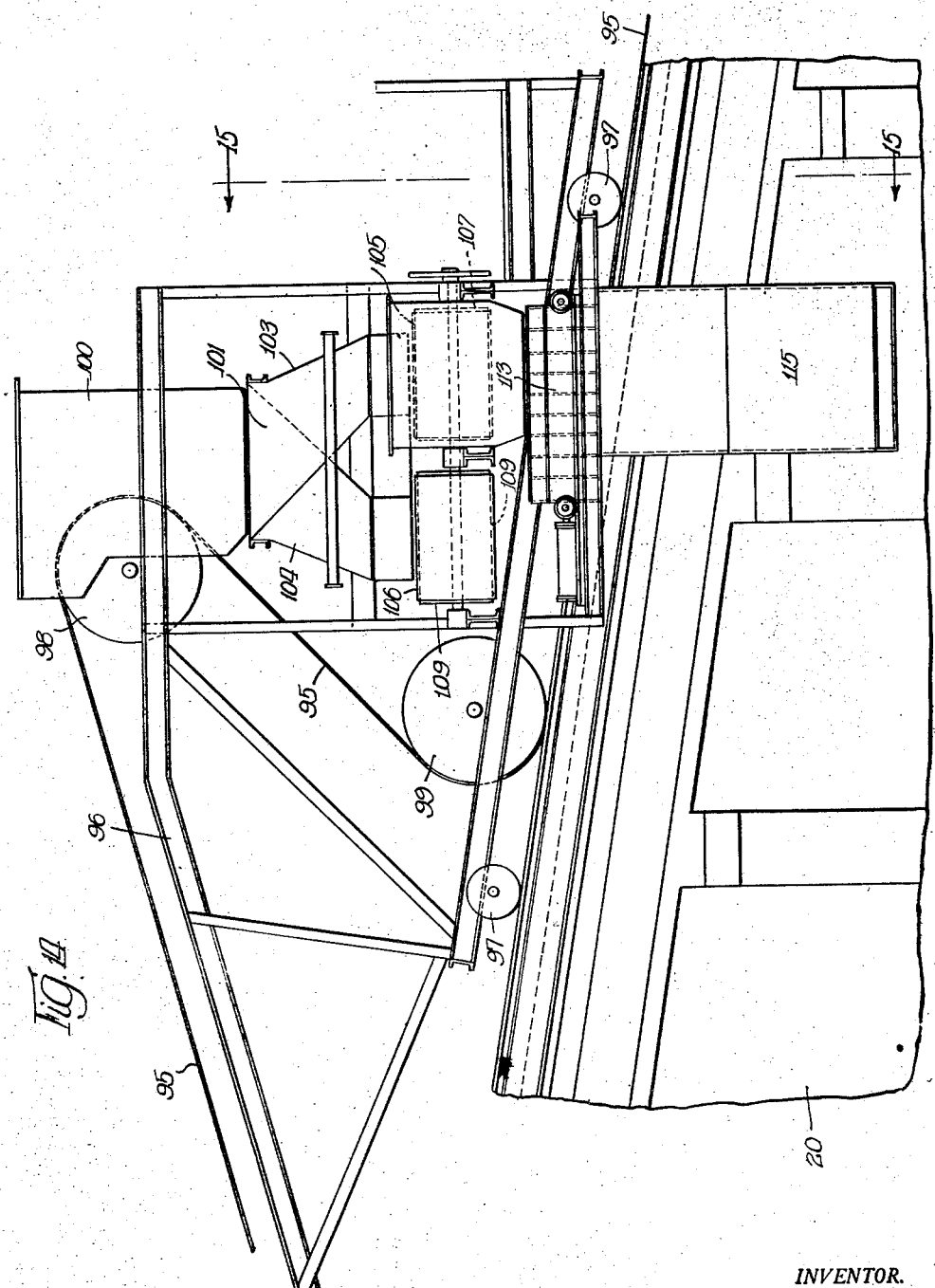

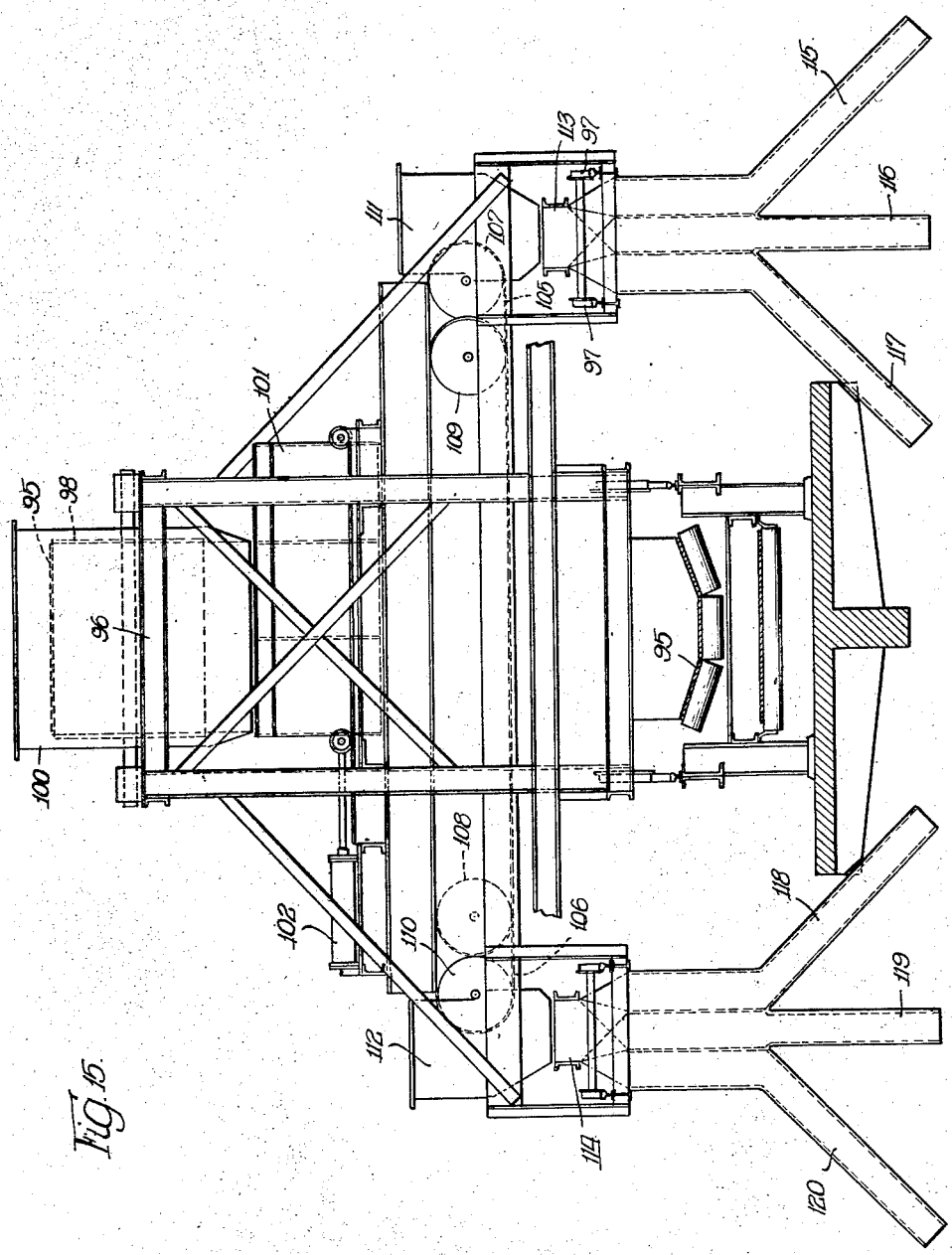

Patented Sept. 25, 1945

2,385,494

UNITED STATES PATENT OFFICE 2,385,494

APPARATUS FOR AVERAGING MATERIALS

Arthur J. Boynton, Chicago, Ill.

Application January 21, 1944, Serial No. 519,247

7 Claims. (Cl. 259—1)

The present invention relates to improvements in apparatus for averaging materials.

More particularly the present invention relates to apparatus for mixing and equalizing the qualities of materials of a granular or pebbly nature which are capable of semi-fluid flow wherein the particles, though somewhat restrained by friction due to their shape or by their adhesion to each other, are capable of relative movement when stressed by gravitational or other forces. The advantages resulting from such equalization are important in subsequent processing of the material. For example, in a metallurgical operation wherein ore, fuel and fluxing materials react on each other, a variation in quality of ore, fuel or flux invariably affects the rate of production, the cost of operation and the quality of the product. Uniformity in all three is greatly to be desired, and it is advisable to eliminate such variations as far as it is economically feasible. Various methods of control are practiced, some of which relate to methods of mining and others to selection of material sources.

Mixing has been well defined as follows: "Mixing of two or more differing materials, existing either separately, or in an unevenly mixed condition, consists in producing a condition wherein each particle of any one material lies as nearly adjacent as possible to a particle of each of the other materials."

According to the present invention, mixing of the materials is done by delivering material simultaneously and continuously to a rapidly moving reclaiming belt or its equivalent from each of a large number of depositions made during successive traverses of a bedding operation. This result is accomplished by reclaiming the material along a plane inclined with respect to the plane of the bedding depositions. This produces a practically complete mixture of samples from the deposits made during each traverse represented in the contents of the bin or the like receiving such material.

The present invention relates to apparatus which may be applied to continuous bedding or to a batch system of bedding. In either case the material is bedded in a bin or the like. For batch system bedding it is essential that the bin be divided into two parallel compartments divided longitudinally by a vertical wall. For the continuous system it is convenient to divide the bin into two compartments. Accordingly, the construction need vary in only a few details whether continuous or batch bedding is to be practiced.

A further object is to provide an improved apparatus for securing an average distribution of material which varies in its characteristics.

A further object is to provide an improved apparatus for averaging materials well adapted to meet the needs of commercial service.

Further objects will appear as the description proceeds.

Referring to the drawings—

Figure 1 is a diagram illustrating the fundamentals of the present invention, representing schematically a section taken along the plane indicated by the arrows 1—1 of Figure 2;

Figure 2 is a diagrammatic view representing a cross section taken along the plane indicated by the arrows 2—2 of Figure 1, illustrating a preferred distribution of materials within a bin or the like;

Figure 3 is a cross sectional view of a structure embodying the principles of the present invention;

Figure 5 is a plan view of the structure illustrated in Figures 3 and 4;

Figure 6 is a sectional view taken along the plane indicated by the arrows 6—6 of Figure 3;

Figure 7 is a view on an enlarged scale illustrating a portion of the structure shown in Figure 3;

Figure 8 is a view on an enlarged scale of a portion of the structure shown in Figures 3 and 7, showing certain feeding and regulating mechanism;

Figure 9 is a sectional view taken along the plane indicated by the arrows 9—9 of Figures 3 and 7;

Figure 10 is a diagrammatic view looking in the direction of the arrows 10—10 of Figures 3 and 7;

Figure 11 is a perspective view of a two-way distributor forming part of the illustrated embodiment of the present invention;

Figure 12 is a perspective view of a three-way distributor forming part of the present invention;

Figure 13 is an enlarged view of part of the structure illustrated in Figure 4, illustrating particularly one of the trippers shown in Figure 4;

Figure 14 is a fragmentary view in side elevation of a modification of the present invention; and Figure 15 is a cross sectional view taken along the plane indicated by the arrows 15—15 of Figure 14.

Figure 4:
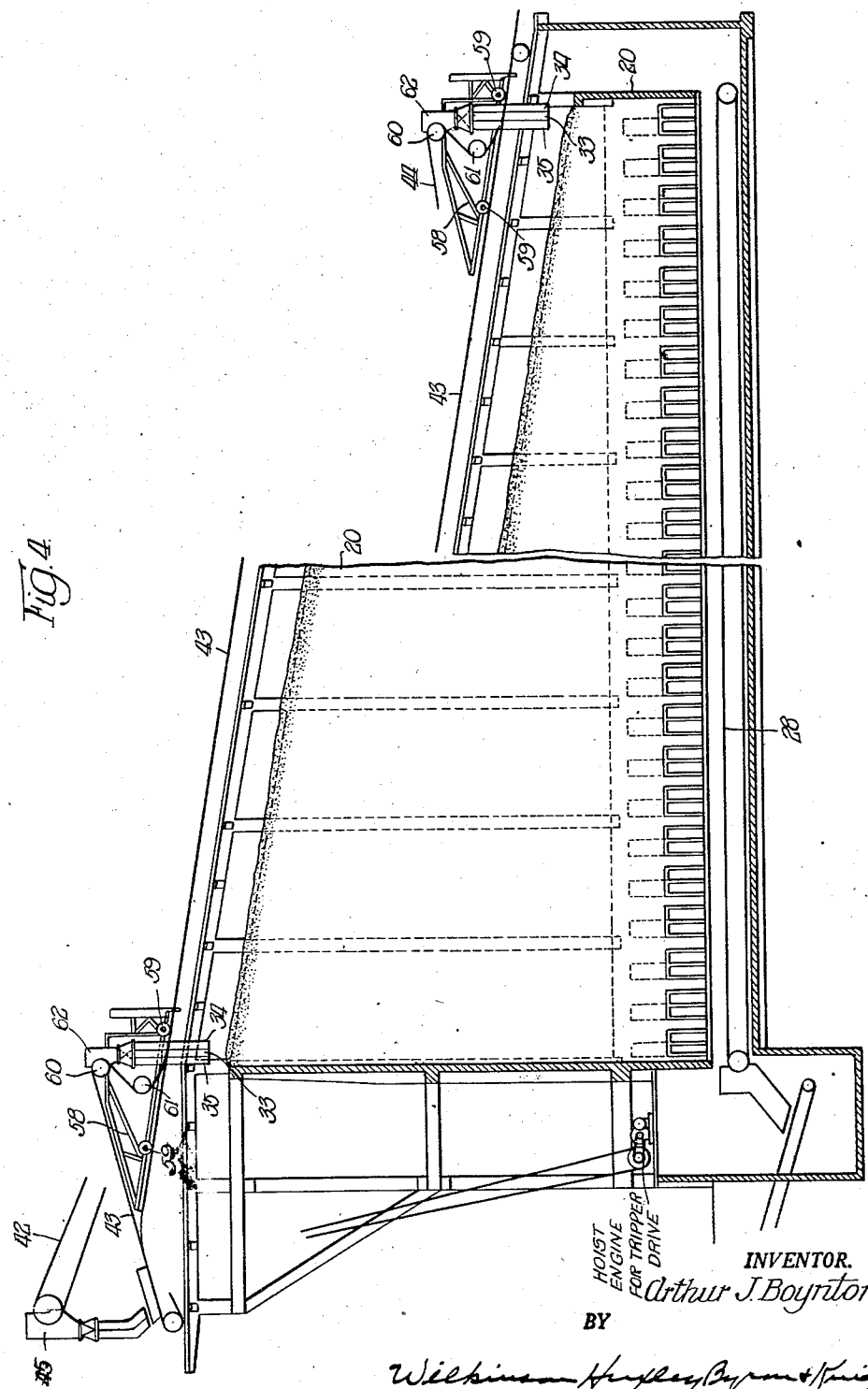
Figure 4 is a cross sectional view taken along the planes indicated by the arrows 4—4 of Figure 3, parts of Figure 4 being broken away.

The underlying principles of the present invention may be understood by referring to Figures 1 and 2, which are diagrammatic in their nature. Said figures represent a double bin higher at one end than at the other, the difference in height being determined by the length of the bin and the bedding angle. The triangle ABC in Figure 1 represents a sectional view of materials bedded according to the principles of the present invention. For convenience, the line AC is represented as a horizontal line and the line AB is shown at an angle to the horizontal. Below the bedding triangle ABC is a prismatic section the upper boundary of which is represented by the horizontal line AC and the lower boundary of which is represented by the horizontal line DE. This section ACED is a balancing section intended to absorb variations in the rate of delivery and to minimize the number of changes necessary to be made in the speed of feed to the reclaiming belt.

Below the balancing section ACED are a pair of hopper bottomed sections with means for reclaiming at equal rates throughout the entire length of the pile. Bedding is done by distributing means which travel along the bed, making a plurality of longitudinal traverses.

Still referring to Figures 1 and 2, the numeral 20 indicates a bin having the vertical side walls 21 and 22 and the vertical middle wall 23. Below said walls are a pair of hopper bottoms, the hopper bottom between the walls 21 and 23 being defined by the sloping bottom walls 24 and 25, the hopper bottom between the walls 22 and 23 being defined by the sloping bottom walls 26 and 27. The outer sloping bottom walls 24 and 26 extend beyond their respective cooperating bottom walls 25 and 27 to form wharfs 24a and 26a, whereby to provide a delivery chute to a collecting belt 28. The inner sloping bottom walls 25 and 27 stop short of their cooperating bottom walls 24 and 26 respectively to provide openings, to be referred to more in detail presently, whereby material from the two bin sections may be delivered continuously to said collecting belt 28.

As indicated above, the material being handled by the apparatus is bedded in successive depositions from distributing means which traverse the bin longitudinally thereof. According to the illustrated embodiment of the present invention, material from a single supply belt or the like is divided into halves, the material from each half being divided into a plurality of streams passing through the conduits represented by the numerals 33, 34 and 35. Material from the right-hand set of conduits 33, 34 and 35 is delivered in three streams symmetrically spaced across the width of the right-hand section of the bin 20, and likewise material from the left-hand set of conduits 33, 34 and 35 is delivered in three streams symmetrically spaced across the width of the left-hand section of the bin 20. The lines 39—39 appearing in Figure 1 represent the strata of the materials deposited in the bin 20 in the longitudinal dispositions of material. Inasmuch as the discharge openings of the two sets of conduits 33, 34 and 35 are symmetrically disposed with reference to the two sections of the bin 20, the various strata 39 will in transverse cross section be disposed in hills and valleys having their axes disposed longitudinally of the bin 20, as illustrated in Figure 2, the crests of said hills being indicated by the numerals 40—40, the lines representing the deepest parts of the valleys being indicated by the numerals 41—41.

According to the present invention, withdrawal of material from the bin 20 is done simultaneously and at an equal rate per unit of length from one end of the bin to the other. The outlets from the two bin sections on the two sides of the middle wall 23 lie in the same horizontal plane. The upper stratum 39, that is, the one last deposited, is continuous from one end of the bin to the other. The lowermost strata are of only short lengths, these strata appearing in the lower left portion of the pile as the parts are viewed in Figure 1. In practice the lowermost strata of material may have been deposited approximately eight hours before the deposition of the uppermost strata. In a practical embodiment of the present invention a total of 252 traverses of the distributing means, depositing 252 strata of material, may occur in a period of approximately eight hours between the deposition of the stratum intersecting the line AC and the deposition of the uppermost stratum. It will be seen that according to the physical embodiment referred to, small increments in all of these 252 strata are withdrawn simultaneously, representing portions of traverses or depositions made at regular intervals during the preceding eight hours. Of course, the period of time and the number of traverses or strata is a matter of choice and the figures referred to are for purposes of illustration only. It will be clear, however, that the material reaching the reclaiming belt 28 at any time contains an equal amount of material from each traverse represented within the bin. Consequently each given short length of the reclaiming belt 28 carries an equal amount from each traverse represented within the bin. Simultaneous withdrawal of an equal amount of material per short unit of length results in the accumulation of a series of samples on the reclaiming belt, each short increment of length of the belt containing a sample. These successive samples will vary from each other only as a major change in quality of material bedded produces a slow and regular trend in the direction of the change. Where the changes are temporary and lie within the usual limits of variation, the material on the reclaiming belt will remain constant in quality, and in any case the material deposited on the reclaiming belt will be an average of the material within the bin.

According to the present invention the flow of material onto the bedding pile should proceed at a constant rate. It should continue from end to end of the pile, and the distribution from side to side of the pile should conform with a definite pattern, which should be constant and applied to each successive layer of material bedded.

The accuracy of the bedding operation depends in some measure on the interval, measured by weight of the deposited material between successive depositions at the same spot; the longer the bed the more rapid should be the passage of the material stream and the smaller the amount deposited at any one traverse within any given area.

The greater the cross section of the pile the more traverses of the distributing means should be made, and the greater the number of traverses in a bed of given cross section the greater becomes the probability of complete accuracy.

Any cross section of the bed represents a great number of samples of the material in the bed. The entire cross section is therefore representative of the average composition of the bed.

In any bin or silo there is a disposition toward maximum movement along a vertical line above the point of withdrawal. This tendency limits the horizontal dimensions of the bin or silo consistent with a practically uniform downward flow. Bins are often subdivided by partitions in order to minimize the sidewise flow and to make the descent of the material more nearly vertical. The same effect or a better effect may be produced by a symmetrical location of the bottom outlets and the provision of means for insuring the same rate of flow through each outlet.

The present invention makes provision for this uniformity of outflow from the bin. As will be pointed out more in detail in connection with Figure 6, to be described presently, the sloping bottom walls of the two bin sections are provided with outlets disposed according to a definite plan correlated to the crests 40—40 and the valleys 41—41 illustrated in Figure 2, to the end that each line of deposition of the material, that is, each crest, is approximately over a line of withdrawal outlets, all of which will be referred to with more particularity hereinafter, particularly in the description of Figure 6.

Not only is it important to have the outlets disposed in proper relationship with the lines of deposition, but the withdrawal of material through said outlets should proceed at an equal rate along the entire length of the bin. The means for accomplishing such uniformity will be described presently, particularly in connection with the descriptions of Figures 3, 8, 9 and 10.

The samples embodied in the various strata 39—39 will vary from each other only as a major change in quality of the material bedded produces a slow and regular trend in the direction of the change. Where the changes are temporary and lie within the usual limits of variation the material on the reclaiming belt 28 will remain constant in quality, and in any case the material deposited on said belt 28 will be an average of the material within the bin.

According to the preferred embodiment of the present invention, bedding is done by means of belts. Referring to Figure 5, a main delivery belt is indicated by the numeral 42. This belt 42 has the function of conveying material to the high point of the pile, from which it is discharged in equal quantities onto two smaller belts which carry the material down the slope. Said two smaller belts are indicated by the numerals 43 and 44. The belts 43 and 44 are provided with distributing means, or trippers as they are known in the art, for depositing material progressively along the length of the pile from the point B to the point A (Fig. 1), and, reversely, from the point A to the point B.

In order to equalize the withdrawal or reclaiming of the material it is necessary that the material shall be subdivided equally in the bedding operation; otherwise it would be impossible to determine whether a low point in the bin is due to a local deficiency in the rate of bedding or to a too rapid local withdrawal.

In the illustrated embodiment of the present invention the material carried to the high point of the bin 20 is divided into two equal parts and delivered to the two side belts 43 and 44 by a stationarily positioned distributor 45.

The distributor 45, as shown in Figures 4 and 11, includes a chute 46 for receiving material carried thereto by the belt 42. Below said chute 46 is a receiving box 47 made up of a plurality of transversely positioned compartments 48, 49, 50, 51, 52 and 53 arranged side by side. Said chute 46 has a width equal to the span of four of the compartments referred to. Connected to the receiving box 46 is the double rack mechanism 54 having a motor 55 cooperating therewith. By means of the motor 55 and the rack 54, a reciprocatory motion can be communicated to the receiving box 47. Alternate compartments, to wit—compartments 48, 50 and 52, have their bottoms open to chute 56, and the intermediate compartments 49, 51 and 53 have their bottoms open to the chute 57. As indicated above, the chute 46 has a width equal to the span of four of the compartments 48, 49, 50, 51, 52 and 53. The motor 55 and rack 54 are so related to the box 47 that said box is reciprocated over a distance equal to half the width of the chute 46. Accordingly, material discharged from any point in the width of the belt 42 into the chute 46 is discharged half of the time into chute 56 and half of the time into chute 57. Said chutes 56 and 57 are positioned to direct material onto the belts 43 and 44 respectively.

According to the illustrated embodiment of the present invention the material from each belt 43 or 44 is divided into three equal streams traveling the length of the bin 20. To accomplish this purpose each of said belts 43 and 44 is provided with a distributing mechanism, indicated as a whole by the numeral 58 (Figs. 4, 12 and 13). Each of said distributor mechanisms is provided with wheels 59 rolling upon inclined tracks located adjacent to their respective belts 43, 44. As shown in Figures 4 and 13, the belt 43 (that particular belt being chosen for illustration) is trained over rollers 60 and 61, roller 60 being disposed forwardly of roller 61, looking downhill, whereby said belt 43 has a reverse bend where it is trained over the roller 60. Material deposited upon either belt 43 or belt 44 to the left of the roller 60 as the parts are viewed in Figures 4 and 13 will be discharged over that part of the belt trained over the roller 60. It will be understood that as each distributing mechanism 58 travels up and down the bin the location of the roller 60 will move correspondingly, and accordingly the point of discharge from the belt 43 or the belt 44 will travel correspondingly. Mechanisms suitable for the purpose are well known in the art and are known as trippers.

Each belt 43, 44 as it passes over its corresponding roller 60 will discharge the material carried thereby into a chute 62. Each of said chutes 62 has an open bottom adapted to deliver material into the distibutor box 63, which is divided into nine transversely positioned compartments bearing the numerals 64, 65, 66, 67, 68, 69, 70, 71, 72. Said chute 62 has a width sufficient to span six of said nine compartments. The distributor box 63 is adapted to be reciprocated transversely, and for this purpose the box 63 is provided with the double rack 73 cooperating with the motor 74. Said distributor box is mounted for movement upon tracks 75—75, said tracks 75—75 and said motor 74 being mounted upon the platform 76. Of said nine compartments those bearing the numerals 64, 67 and 70 have open bottoms discharging into chute 33 above referred to. Compartments bearing the numerals 65, 68 and 71 have open bottoms discharging into chute 34, and those compartments bearing the numerals 66, 69 and 72 discharge into chute 35. The chutes 33, 34 and 35 carry material from each of the belts 43, 44 and have their outlets positioned above the two bin sections on the two sides of the dividing wall 23 of the bin 20. As shown in Figures 2 and 3, the outlet from the middle chute 34 leading from each belt 43, 44 is positioned midway of the width of its corresponding bin section. The outlets from the other two chutes 33 and 35 are positioned to deliver material at regions spaced midway between the outlet of their corresponding chute 34 and the side walls of their particular bin section. In other words, the three chutes 33, 34 and 35 leading from each of the two belts 43, 44 are positioned to deliver material symmetrically with respect to the width of their corresponding bin sections and symmetrically with respect to the bin 20 as a whole.

Though the distributor box 47 cooperating with the belt 42 and each distributor box 63 cooperating with the belt 43 and belt 44 have been illustrated as comprising six compartments and nine compartments, respectively, other arrangements may, of course, be chosen. A formula which will be found convenient for choosing the arrangement of compartments within a distributor box for dividing a stream into a predetermined number of subdivisions is as follows: The distributor box is divided into contiguous transverse compartments of equal width, the width of each compartment being an aliquot part of the width of the stream to be divided, the transverse dimension of the distributor box being equal to the width of the stream to be divided plus a fraction of that width of which the numerator is the number of parts into which the stream is to be divided and the denominator is the number of compartments having a combined transverse dimension equal to the width of the stream to be divided. The number of conduits for receiving the discharge from the various compartments of said distributor box will be equal in number to the number of parts into which the flowing stream is to be divided, and said conduits will be positioned to receive material from said compartments, each of said conduits having communication at any one time with a number of said compartments equal to the number of parts into which said flow is to be divided, said last mentioned compartments being spaced apart by a number of compartments equal to the number of parts into which said flow is to be divided. The minimum length of transverse motion of the distributor box is equal to the difference between the transverse dimension of the distributor box and the width of the stream to be divided.

It is preferred to have the two trippers 58 connected to move simultaneously, one traveling downwardly of the bin 20 while the other is traveling upwardly of said bin along their corresponding belts 43, 44. Said trippers may be connected in balanced relationship by means of a cable analogous to that employed in a funicular or inclined railway. For practical reasons it will be preferred to have each of said trippers face downhill; that is to say, said trippers will be so disposed that the roller 60 thereof will be disposed forwardly of the roller 61 in the direction facing toward the low end of the bin 20.

As indicated above, one of the principles of bedding and reclaiming materials requires a downward movement at the same rate throughout the bin. The arrangement of withdrawal outlets as commonly provided in bins will not accomplish the desired result. There will be a tendency toward maximum downward movement immediately above the points of withdrawal with a slower rate of movement at other points, the speed decreasing as the angle with the vertical increases. The difference in rate of descent is sufficient to disturb the bedding arrangement to cause considerable variation from a correct sample in reclaiming. The present invention contemplates improvements in the apparatus for and method of withdrawal of material from the bin. According to the present invention withdrawal is accomplished by providing openings arranged according to a plan consistent with the lines of deposition of material from the two sets of chutes 33, 34 and 35 (Figs. 2 and 3).

For an understanding of the arrangement of the withdrawal outlets, reference may be had to Figures 2, 3, 6 and 7. The bottom of each bin section is provided with a series of outlets 77 extending the length of the bin located in the vertical plane midway between the walls of its particular bin section. In other words, this series of openings 77 is located in the vertical plane which marks the travel of the outlet of the chute 34 associated with that particular bin section. Communicating with said series of outlets 77 are conduits 78 and 79 extending along the sloping bottom walls of that particular bin section. Referring to the right-hand bin section, the conduit 78 extends along the bottom wall 24 and the conduit 79 extends along the bottom wall 25. Referring to the left-hand bin section, the conduit 78 extends along the bottom wall 26 and the conduit 79 extends along the bottom wall 27. Said conduits 78 and 79 are formed by conduit structures 80 and 81 respectively, having the effective centers of their inlet openings located in the vertical planes which mark the paths of movement of the discharge outlets of the chutes 33 and 35. The inlet opening to the conduit structure 80 is indicated by the numeral 82 and the inlet opening to the conduit structure 81 is indicated by the numeral 83. By reference to Figure 6 it will be noted that the openings 77 extend practically continuously along the bottom of each bin section, being interrupted only by the side walls of the conduit structures 80 and 81. It will be noted also from an inspection of Figure 6 that every third opening 77 communicates directly with the body of its particular bin section.

For convenience of reference the plan view of the bottom of a bin section has been divided into squares, each square having a dimension on its sides equal to one-third of the distance between the inner surfaces of the vertical walls defining that bin section. The corners of said squares are indicated by the numerals 84—84 in Figure 6. There are three longitudinal series of squares shown in Figure 6, the squares of these three series being disposed in echelon. In other words, referring to the right-hand bin section, the centers of the middle series of squares are in symmetrically stepped relationship with the centers of the two series of squares disposed along the side wall 21 and the middle wall 23. Referring to the left-hand bin section, the middle series of squares are in symmetrically stepped relationship with the two series of squares disposed along the side wall 22 and the middle wall 23. In a practical embodiment of the present invention it has been preferred to provide a bin structure in which each bin section has an inside diameter of three squares wide and 54 squares long. The effective centers of the inlet openings 82 and 83 of the conduit structures 80 and 81 respectively are located approximately at the centers of the squares above referred to. The openings 77 which communicate directly with the body of the particular bin structure are located at the centers of the middle series of squares. By reason of the structure illustrated and described, material is continuously discharged from the body of each bin section along three series of openings, one series disposed below the crest of the hill deposited from the conduit 33, another series disposed below the crest of the hill deposited from the conduit 34, and the third series disposed below the crest of the hill deposited from the conduit 35. Withdrawal along the three lines indicated is symmetrical throughout the length of the bin.

Material discharged from each bin section travels lang the wharfs 24a and 26a to the opening 84a, which extends the length of the bin and discharges material onto the reclaiming belt 28.

In order to obtain the correct sampling effect continuously, it is necessary that material from all of the outlets 77 shall be withdrawn at an equal rate. It is also essential that the rate of withdrawal shall be variable at will and capable of correspondence with the rate of bedding, that is—with the rate of deposition at the top of the bed. In order to accomplish these objects the present invention provides a system of feeders, sectionalized for convenience in driving, but otherwise continuous. These feeders operate on the discharge side of all of the outlets 77 and are symmetrical with respect to them. Said feeders are indicated by the numerals 85—85 (Figs. 3 and 8). Said feeders may be made up of sections of wrought iron pipe 86 with vanes 87 extending radially therefrom, which vanes may extend the length of the bin except for such interruptions as may be required for bearings, driving motors, and other such accessories. The outer edges of each of the vanes of the feeders 85 may operate in arcuate recesses 88—88 in the corresponding wharfs 24a and 26a. A series of motors 89—89 may be provided, which, through sprocket chains 90—90, communicate driving movement to the feeders 85—85.

To provide control of the flow of material at various locations along the wharfs 24a and 26a, a plurality of pairs of gates 91—91 are provided. Said gates are illustrated in Figures 7, 8 and 9. Said gates 91—91 consist of quadrilateral sheets each having an edge pivoted to swing about a corresponding pintle 92 located in an upstream direction with reference to the remainder of said gates 91—91. Said gates have their flat surfaces disposed in right-angular relationship with their corresponding wharfs 24a and 26a. The gates of each pair of gates are connected together adjacent to their swinging edges by means of screw shafts 93, which screw shafts at their extremities are provided with right-hand and left-hand threads, the mid portion of each of said screw shafts being provided with a non-round portion adapted to be gripped in a wrench. Mounted upon each threaded end portion of each screw shaft 93 is a nut 94. Said nuts 94 have grooved peripheries interfitting with corresponding apertures adjacent to the swinging edges of cooperating gates 91—91. It will be clear that rotation of each screw shaft 93 in one direction or the other will swing the gates of each pair of gates toward or away from each other to regulate the flow of material therebetween.

According to the figures assumed above, which have been chosen merely for the purpose of illustration and should not be considered in a limiting sense, each bin section is three squares wide and 54 squares long, having a total of 162 outlets from each bin section, making a total of 324 outlets from the bin. An attendant at the top of the bin and an attendant below may communicate with each other concerning variations from a constant rate of bedding or of withdrawal, and the gates 91—91 may be regulated accordingly.

The balancing section indicated by the figure ADEC in Figure 1 will take care of short swings in the rate of delivery of material by the distributing mechanism at the top of the pile and minimize the number of general speed changes of the feeders 85—85. Local inequalities in the height of material at any region along the length of the bin may be corrected by changing the opening of the corresponding gates 91—91. The rate of variation will be slow enough to permit the making of the simple manual regulation required.

Figures 14 and 15 illustrate a modification of the structure disclosed in Figures 3 to 13.

According to the structure disclosed in Figures 14 and 15, a single belt is utilized for carrying material to the top of the bin 20 and for distributing said material through a number of trips or traverses in a plurality of streams lengthwise of the bin. In the embodiment illustrated in Figures 14 and 15 the belt is indicated by the numeral 95. Said belt 95 is controlled by the tripper 96, which is mounted upon wheels 97—97 traveling upon inclined tracks fixedly positioned relative to the bin 20. Said tripper 96 is provided with the upper roll 98 and the lower roll 99, the roll 98 being disposed forwardly of the roll 99 in the direction toward the lower end of the bin 20. The belt 95 is trained over the rolls 98 and 99 whereby to produce a reverse bend in said belt where said belt passes over said roll 98. In a manner similar to the action described in connection with Figures 3 to 13 inclusive, the location of this reverse bend travels from one end to the other of the bin 20 as the tripper 96 travels from one end to the other of said bin.

Mounted upon said tripper 96 is the chute 100 positioned to receive material from the belt 95 as it passes over the reverse bend thereof located at the region of the roll 98 and adapted to discharge such material into a distributor box 101 to divide the material from said chute into two paths. The construction of the distributor box 101 associated with the chute 100 may be similar to the construction of the distributor box 47 illustrated in Figure 11 and no separate description of the distributor box 101 need be given. Said distributor box 101 is reciprocated in a right-hand and left-hand direction as the parts are viewed in Figure 15 by means of the air cylinder 102. The distributor box 101 delivers into the two chutes 103 and 104, which respectively deliver material to the endless belts 105 and 106. Said belt 105 is trained over the two spaced pulleys 107 and 108. Belt 106 is trained over the two pulleys 109 and 110 (Fig. 15). Belt 105 carries material deposited thereon toward the right as the parts are viewed in Figure 15, and belt 106 carries material deposited thereon toward the left as the parts are viewed in said figure. Material from belt 105 is delivered into the hopper 111, and material on the belt 106 is delivered into the hopper 112. Said hopper 111 delivers material into a distributor box 113, which may be similar in its construction to the distributor box 63 illustrated in Figure 12. The hopper 112 delivers material into the distributor box 114, which may also be similar to the distributor box 63 illustrated in Figure 12. Said distributor box 113 will deliver material therefrom into the three chutes 115, 116 and 117. The distributor box 114 will deliver material therefrom into three chutes 118, 119 and 120. In short, the construction illustrated in Figures 14 and 15 divides the material from belt 95 into two equal streams to the belts 105 and 106. The material from each of these two belts is divided into three equal streams, the ultimate delivery being made through the chutes 115, 116, 117, 118, 119 and 120.

Recapitulating, the present invention in some of its salient aspects provides an improved method and improved apparatus for averaging material in which said material is deposited in a pile in successive strata in a stream (or preferably in a plurality of equalized streams) in a plurality of successive traverses, withdrawal being accomplished along a plane angularly disposed with reference to said strata.

According to the structure illustrated in Figures 3 to 13 inclusive, the material to be handled is carried to the top of the pile at one end thereof in one belt and is divided into two equal streams and delivered to two other belts, each provided with a tripper or equivalent means, the two trippers being counterbalanced in a manner analogous to a funicular or inclined railway for simultaneously depositing strata of material along the length of two parallel bin sections. According to the structure illustrated in Figures 14 and 15, a single belt serves for the distribution of material in successive strata along the length of a pair of parallel bin sections.

In the structures disclosed in Figures 3 to 15 inclusive the various strata are deposited along lines inclined to the horizontal and withdrawal is accomplished from the bottoms of the bin sections along horizontal lines, the withdrawal being accomplished through outlets in the bottom of said bin sections arranged according to a plan correlated with the regions of depositions of material in the strata referred to.

Means are provided for regulating the outflow of material from the bin sections whereby the discharge of material may be governed to accord with the speed of the deposition thereof at the tops of the piles. Regulating means are also provided for preventing undesired inequalities in the rate of flow of the material being handled.

Though certain preferred embodiments of the present invention have been described in detail, many modifications will occur to those skilled in the art. It is intended to cover all such modifications that wall within the scope of the appended claims.

What is claimed is:

1. Apparatus for dividing a continuous flow of material into equal parts comprising, in combination, means for directing such flow, a distributor box for receiving said material from said directing means, said distributor box being divided into a plurality of contiguous compartments of equal width spaced transversely with respect to said directing means, the transverse dimension of each of said compartments being an aliquot part of the width of said directing means, the effective transverse dimension of said distributor box being equal to the width of said directing means plus a fraction of that width of which the numerator is the number of parts into which the flow is to be divided and the denominator is the number of compartments of which the combined transverse dimension is equal to the width of said directing means, and means for imparting a reciprocatory transverse motion to said distributor box, the length of such motion being equal to the difference between the transverse dimension of said distributor box and the width of said directing means.

2. Apparatus for dividing a continuous flow of material into equal parts comprising, in combination, means for directing such flow, a distributor box for receiving said material from said directing means, said distributor box being divided into a plurality of contiguous compartments of equal width spaced transversely with respect to said directing means, the transverse dimension of each of said compartments being an aliquot part of the width of said directing means, the effective transverse dimension of said distributor box being equal to the width of said directing means plus a fraction of that width of which the numerator is the number of parts into which the flow is to be divided and the denominator is the number of compartments of which the combined transverse dimension is equal to the width of said directing means, means for imparting a reciprocatory transverse motion to said distributor box, the length of such motion being equal to the difference between the transverse dimension of said distributor box and the width of said directing means, and a plurality of discharge conduits, equal in number to the number of parts into which said flow is to be divided, positioned to receive material from said compartments, each of said conduits having communication at any one time with a number of said compartments equal to the number of parts into which said flow is to be divided, said last mentioned compartments being spaced apart by a number of compartments equal to the number of parts into which said flow is to be divided.

3. In averaging apparatus, in combination, a bin having outlets in the bottom thereof, said outlets being disposed substantially at the central points of a plurality of series of squares arranged in a vertically projected horizontal area of said bin, which squares are disposed in symmetrical stepped relationship with one another, the sum of said squares making up the horizontal area of said bin, and means for depositing material in said bin along lines disposed directly above said outlets.

4. In averaging apparatus, in combination, a bin having outlets in the bottom thereof, said outlets being disposed substantially at the central points of a plurality of series of squares arranged in a vertically projected horizontal area of said bin, which squares are disposed in symmetrical stepped relationship with one another, the sum of said squares making up the horizontal area of said bin, and means for depositing material in said bin along lines disposed directly above said outlets, said outlets being disposed along lines angularly disposed in vertical planes relative to the lines of deposition of material within said bin.

5. In averaging apparatus, in combination, a bin, means dividing said bin into a pair of parallel bin sections, means providing a flow of material, and means dividing said flow of material into equal divisions and depositing said material into bin sections along lines symmetrically disposed with respect to the side walls of said bin, which lines are inclined to the horizontal, each of said bin sections having a hopper bottom portion having means for directing discharge of material from their corresponding bin sections, said directing means providing discharge openings directly below said lines, each of said hopper bottom portions having a wharf, said wharfs being positioned to direct said material to a common region.

6. In averaging apparatus, in combination, a bin, means dividing said bin into a pair of parallel bin sections, means providing a flow of material, and means dividing said flow of material into equal divisions and depositing said material into bin sections along lines symmetrically disposed with respect to the side walls of said bin, which lines are inclined to the horizontal, each of said bin sections having a hopper bottom portion having means for directing discharge of material from their corresponding bin sections, said directing means providing discharge openings directly below said lines, each of said hopper bottom portions having a wharf, said wharfs being positioned to direct said material to a common region, said wharfs being provided with feeder means for controlling the speed of discharge from said hopper bottom portions.

7. In averaging apparatus, in combination, a bin, means dividing said bin into a pair of parallel bin sections, means providing a flow of material, and means dividing said flow of material into equal divisions and depositing said material into bin sections along lines symmetrically disposed with respect to the side walls of said bin, which lines are inclined to the horizontal, each of said bin sections having a hopper bottom portion having means for directing discharge of material from their corresponding bin sections, said directing means providing discharge openings directly below said lines, each of said hopper bottom portions having a wharf, said wharfs being positioned to direct said material to a common region, said wharfs being provided with gates, and means for controlling said gates to govern the rate of flow of material along said wharfs at different regions along said wharfs.

ARTHUR J. BOYNTON.